(12) United States Patent
Xiao et al.

(10) Patent No.: US 9,432,894 B2
(45) Date of Patent: Aug. 30, 2016

(54) METHOD AND DEVICE FOR POSITIONING USER EQUIPMENT IN HANDOVER PROCESS

(71) Applicant: Huawei Technologies Co., Ltd., Shenzhen, Guangdong (CN)

(72) Inventors: Dengkun Xiao, Shenzhen (CN); Tong Wu, Shenzhen (CN); Jie Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 14/159,366

(22) Filed: Jan. 20, 2014

(65) Prior Publication Data

US 2014/0135013 A1 May 15, 2014

Related U.S. Application Data

(63) Continuation of application No. PCT/CN2012/078964, filed on Jul. 20, 2012.

(30) Foreign Application Priority Data

Jul. 20, 2011 (CN) .......................... 2011 1 0203898

(51) Int. Cl.
*H04W 36/08* (2009.01)
*H04W 64/00* (2009.01)
*H04W 4/20* (2009.01)

(52) U.S. Cl.
CPC ............... *H04W 36/08* (2013.01); *H04W 4/20* (2013.01); *H04W 64/00* (2013.01)

(58) Field of Classification Search
CPC ..... H04W 36/08; H04W 4/20; H04W 64/00; H04W 4/023; H04W 64/003; H04W 64/006; H04W 88/02; H04W 36/0083; H04W 52/34

USPC .............. 455/436, 438, 445, 456.1; 370/331, 370/310, 394, 389, 328
See application file for complete search history.

(56) References Cited

U.S. PATENT DOCUMENTS 6,366,781 B1    4/2002  Hussain et al.
2002/0167444 A1 11/2002  Lee
(Continued)

FOREIGN PATENT DOCUMENTS

CN          1383282 A      12/2002
CN        101931863 A      12/2010
(Continued)

OTHER PUBLICATIONS

"3GPP TS 36.423—$3^{rd}$ Generation Partnership Project; Technical Specification Group Radio Access Network; Evolved Universal Terrestrial Radio Access Network (E-UTRAN); X2 application protocol (X2AP) (Release 10)," Version 10.2.0, $3^{rd}$ Generation Partnership Project, Valbonne, France (Jun. 2011).

(Continued)

*Primary Examiner* — Phuoc H Doan
(74) *Attorney, Agent, or Firm* — Leydig, Voit & Mayer, Ltd

(57) ABSTRACT

Embodiments of the present invention provide a method and a device for positioning a user equipment in a handover process. The method mainly includes: receiving, by a target base station of the user equipment in the handover process, positioning measurement related information of the user equipment transmitted from a source base station of the user equipment; and performing, by the target base station, a positioning measurement for the user equipment according to the positioning measurement related information after the user equipment has accessed the target base station successfully. Embodiments of the present invention enables the target base station to perform positioning measurement for the user equipment immediately after the UE has successfully accesses the target base station, and eliminates the need for a positioning server to retrigger a user equipment positioning process, thus reduces the signaling cost caused by retriggering the user equipment positioning process.

8 Claims, 3 Drawing Sheets

(56) References Cited

U.S. PATENT DOCUMENTS

| | | | |
|---|---|---|---|
| 2003/0202489 A1* | 10/2003 | Lee | 370/331 |
| 2007/0004430 A1 | 1/2007 | Hyun et al. | |
| 2009/0088161 A1* | 4/2009 | Narasimha et al. | 455/436 |
| 2011/0045834 A1* | 2/2011 | Kim et al. | 455/438 |
| 2012/0094676 A1 | 4/2014 | Hapsari et al. | |

FOREIGN PATENT DOCUMENTS

| | | |
|---|---|---|
| CN | 101998228 A | 3/2011 |
| CN | 102036324 A | 4/2011 |
| JP | 2009213133 A | 9/2009 |

OTHER PUBLICATIONS

"Further discussion on E-CID positioning during handover," 3GPP TSG RAN WG3 Meeting #82, San Francisco, USA, R3-132069, $3^{rd}$ Generation Partnership Project, Valbonne, France (Nov. 11-15, 2013).

"3GPP TS 36.413-$3^{rd}$ Generation Partnership Project; Technical Specification Group Radio Access Network; Evolved Universal Terrestrial Radio Access Network (E-UTRAN); S1 Application Protocol (S1AP) (Release 10)," Version 10.2.0, pp. 83-253, $3^{rd}$ Generation Partnership Project, Valbonne, France (Jun. 2011).

"$3^{rd}$ Generation Partnership Project; Technical Specification Group Radio Access Network; Evolved Universal Terrestrial Radio Access(E-UTRA); LTE Positioning Protocol A(LPPa)(Release 9)," 3GPP TS 36.455, V9.1.0, $3^{rd}$ Generation Partnership Project, Valbonne, France (Mar. 2010).

"$3^{rd}$ Generation Partnership Project; ; Technical Specification Group Radio Access Network; Evolved Universal Terrestrial Radio Access Network(E-UTRAN); X2 application protocol(X2AP)(Release 8)," 3GPP TS 36.423, V.8.9.0, $3^{rd}$ Generation Partnership Project, Valbonne, France (Mar. 2010).

* cited by examiner

METHOD AND DEVICE FOR POSITIONING USER EQUIPMENT IN HANDOVER PROCESS

CROSS-REFERENCE TO RELATED APPLICATIONS

This application is a continuation of International Patent Application No. PCT/CN2012/078964, filed on Jul. 20, 2012, which claims priority to Chinese Patent Application No. 201110203898.9, filed on Jul. 20, 2011, both of which are hereby incorporated by reference in their entireties.

TECHNICAL FIELD

The present invention relates to the field of communication technologies and, in particular, to a method and device for positioning a UE (User Equipment, user equipment) in a handover process.

BACKGROUND

In a wireless network, a HO (handover, handover) of a service node caused by movement of a UE occurs frequently, especially, in the future LTE (Long Term Evolution, long term evolution)-A system, the HO between nodes will become more frequently because of the introduction of plenty of LPN (Low Power Node, low power node) nodes.

"Positioning" is a service provided by the network side for a UE to pre-estimate precise position information, which is mainly used in some scenes related to social security, for example, arresting criminals, guiding escape routes, and etc. Therefore, the occurrence frequency of positioning service is relatively low. In the practical application, it is possible that the positioning process of a UE is in conflict with the handover process of the UE in the network, that is, the current UE not only needs to perform positioning but also needs to perform handover.

For the E-CID (Enhanced Cell-ID, enhanced Cell-ID positioning method) positioning manner, a frequently-used positioning method is a Rx (receiving time)-Tx (transmitting time) method. In the frequently-used positioning method, is the UE measures the CRS (Cell-specific reference signals, cell-specific reference signals) of the serving cell to estimate the Rx at the UE side, and transmits the uplink SRS (Sounding Reference Signal, sounding reference signal) signal to estimate the Tx at the UE side, thus the UE calculates the time difference of Rx-Tx at the UE side, and then reports the result to the serving eNB (evolved Node B, evolved base station). The serving eNB, by measuring the Rx-Tx time difference of itself, and then taking consideration of the Rx-Tx time difference reported by the UE side, may calculates the radius of a circle away from the service eNB on which the UE currently locates, and the serving eNB also measures the UE AOA (Angle of Arrival, angle of arrival), where the AOA is a relative angle between the radio wave signal transmitted by the terminal and the eNB reference direction, and is estimated by the eNB through the directive antenna or the array antenna. And then, the serving eNB reports the above obtained information to a positioning server, and the positioning server determines the precise position of the UE according to the above information.

In the process of implementing the invention, the inventor found that the prior art has the following disadvantages at least: when the UE carries out the E-CID positioning, the UE may has trigged a HO already, it means that the quality of the link between the serving eNB and the UE is poor, or even disconnected completely, therefore, the measurement result of the Rx-TX at the UE side can't been reported to the serving eNB, thereby causing a failure of the UE E-CID positioning.

The positioning server needs to initiate a positioning request to a new eNB after the UE successfully handovers to the new eNB, thereupon, it needs to add a mass of signaling between the eNB and the positioning server, and the positioning delay will be relatively long.

SUMMARY

Embodiments of the present invention provide a method and device for positioning a UE in a handover process, so as to positioning the UE in a handover process efficiently.

A method for positioning a user equipment in a handover process, including:

receiving, by a target base station of the user equipment in the handover process, positioning measurement related information of the user equipment transmitted from a source base station of the user equipment; and performing, by the target base station, a positioning measurement for the user equipment according to the positioning measurement related information after the user equipment has accessed the target base station successfully.

A target base station, including:

a positioning measurement related information receiving module, configured to receive positioning measurement related information of a user equipment transmitted from a source base station of the user equipment in a handover process; and a positioning measurement processing module, configured to perform a positioning measurement for the user equipment according to the positioning measurement related information after the user equipment has accessed the target base station successfully.

A source base station, including:

a positioning measurement related information receiving module, configured to receive positioning measurement related information of a user equipment in a handover process transmitted from a mobility management entity, wherein the positioning measurement related information is transmitted to the mobility management entity by a positioning server;

a positioning measurement related information transmitting module, configured to transmit the positioning measurement related information to the user equipment and a target base station of the user equipment.

A system for positioning a user equipment in a handover process, including the target base station and the source base station.

According to the technical solutions provided by embodiments of the present invention, the source base station transmits the positioning measuring related information of the user equipment to the target base station, thereby enabling the target base station to perform positioning measurement for the user equipment immediately after the UE has successfully accesses the target base station, and eliminating the need for a positioning server to retrigger a user equipment positioning process, thus reducing the signaling cost caused by retriggering the user equipment positioning process, and shortening the positioning delay of the user equipment.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DESCRIPTION OF EMBODIMENTS

To make the objectives, the technical solutions, and the advantages of embodiments of the present invention clearer, the technical solutions in embodiments of the present invention are hereinafter described clearly and completely with reference to the accompanying drawings in embodiments of the present invention. Apparently, the described embodiments are merely a part of embodiments of the present invention, rather than all embodiments of the present invention. All other embodiments obtained by persons of ordinary skill in the art based on embodiments of the present invention without creative efforts shall fall within the protection scope of the present invention.

For ease of understanding embodiments of the present invention, some specific embodiments of the present invention, which are taken as examples, are describe in detail below with reference to the accompanying drawings, and each of embodiments does not constitute a restriction of embodiments of the present invention.

Embodiment 1

Figure 1:
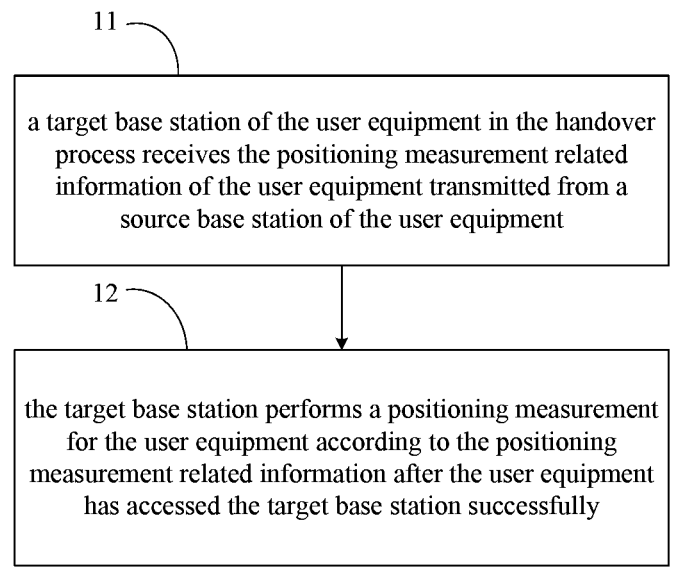
FIG. 1 is a process flowchart of a method for positioning a UE according to a first embodiment of the present invention.

A process flow of a method for positioning a user equipment in a handover process according to this embodiment is as shown in FIG. 1, including the following processing steps:

11. a target base station of the user equipment in the handover process receives the positioning measurement related information of the user equipment transmitted from a source base station of the user equipment;

12. the target base station performs a positioning measurement for the user equipment according to the positioning measurement related information after the user equipment has accessed the target base station successfully.

According to the technical solutions provided by embodiments of the present invention, the source base station transmits the positioning measuring related information of the user equipment to the target base station, thereby enabling the target base station to perform positioning measurement for the user equipment immediately after the UE has successfully accesses the target base station, and eliminating the need for a positioning server to retrigger a user equipment positioning process.

Embodiment 2

Figure 2:
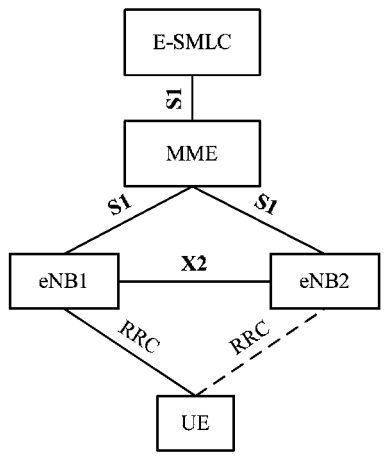
FIG. 2 is a schematic diagram of an application scene of a method for positioning a UE according to a second embodiment of the present invention.

A schematic diagram of an application scene of a method for positioning a UE according to this embodiment is as shown in FIG. 2, in which, both a source eNB and a target eNB are connected to the same MME (Mobility Management Entity, mobility management entity), the MME is connected to a positioning server E-SMLC (Evolved Serving Mobile Position Centre, evolved serving mobile position centre) used for initiating the UE positioning service, and the source eNB communicates with the target eNB via an X2 interface. In this application scene, the UE is performing the E-CID positioning, and then triggers the handover.

Figure 3:
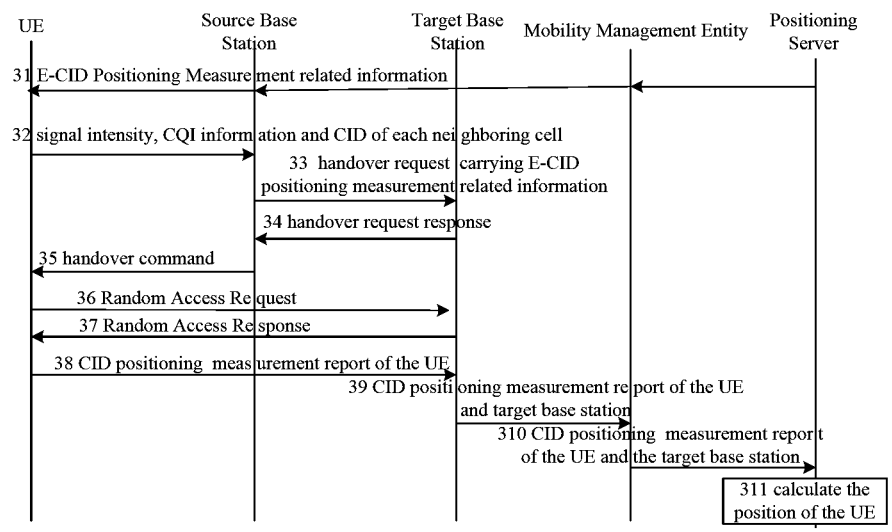
FIG. 3 is a process flowchart of a method for positing a UE according to a second embodiment of the present invention.

Based on the application scene as shown in FIG. 2, a process flow of a method for positing a UE according to this embodiment is as shown in FIG. 3, including the following processing steps:

Step 31: A E-SMLC initiates a UE E-CID Positioning, and transmits a LPP (Long Term Evolution Positioning Protocol, long term evolution positioning protocol) signaling which carries E-CID positioning measurement related information of the UE to a MME, and then the MME forwards the LPP signaling to a source eNB. After receiving the LPP signaling, the source eNB transmits the LPP signaling or a RRC (Radio Resource Control, radio resource control protocol) signaling which carries the E-CID positioning measurement related information to the UE. The E-CID positioning measurement related information mainly includes: a LPPa Transaction ID (Long Term Evolution Positioning Protocol Class A Transaction Identity), an E-SMLC UE Measurement ID (UE measurement identity of the positioning server), an eNB UE Measurement ID (UE measurement identity of the eNB), and information indicating the UE to perform the E-CID measurement.

The UE performs the E-CID positioning measurement according to the received LPP signaling or RRC signaling.

Step 32: when the UE performs the E-CID positioning measurement, the source eNB triggers the UE HO criterion, and the UE performs the UE HO process. In the HO process, the UE needs to measure information such as the signal intensity, CQI (Channel Quality Indicator, channel quality indicator) information and CID (Connection Identity, connection identity) information of each neighboring cell.

The UE transmits a measurement report which carries the signal intensity, CQI information and CID information of each neighboring cell obtained by measuring to the source eNB.

Step 33: after receiving the measurement report transmitted by the UE, the source eNB taken the neighboring cell having the strongest signal intensity as the target eNB of the UE according to the information carried in the measurement report.

The source eNB transmits a HO Request (request) to the target eNB via an X2 interface, where the HO Request includes the E-CID positioning measurement related information of the UE transmitted from the E-SMLC.

A HO Request structure in which the E-CID positioning measurement related information is added according to this embodiment is as shown in table 1 below.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| LPPa Transaction ID | O | | | | | |
| E-SMLC UE Measurement ID | O | | INTEGER(1 ... 15, ...) | | YES | reject |
| eNB UE Measurement ID | O | | INTEGER(1 ... 15, ...) | | YES | reject |
| GUMMEI | M | | 9.2.16 | | YES | reject |
| UE Context Information | | 1 | | | YES | reject |
| > MME UE S1AP ID | M | | INTEGER (0 ... $2^{32}$ - 1) | MME UE S1AP ID allocated at the MME | — | — |
| >>E-CID UE Indication | O | | | | | |
| > UE Security Capabilities | M | | 9.2.29 | | — | — |
| >AS Security Information | M | | 9.2.30 | | — | — |
| > UE Aggregate Maximum Bit Rate | M | | 9.2.12 | | — | — |
| > Subscriber Profile ID for RAT/Frequency priority | O | | 9.2.25 | | — | — |
| >E-RABs To Be Setup List | | 1 | | | — | — |
| >>E-RABs To Be Setup Item | | 1 to <maxnoof Bearers> | | | EACH | ignore |
| >>> E-RAB ID | M | | 9.2.23 | | — | — |
| >>> E-RAB Level QoS Parameters | M | | 9.2.9 | Includes necessary QoS parameters | — | — |
| >>> DL Forwarding | O | | 9.2.5 | | — | — |
| >>> UL GTP Tunnel Endpoint | M | | GTP Tunnel Endpoint 9.2.1 | SGW endpoint of the S1 transport bearer. For delivery of UL PDUs | — | — |
| >RRC Context | M | | OCTET STRING | Includes the RRC Handover Preparation Information message as defined in subclause 10.2.2 of [9]. | — | — |
| >Handover Restriction List | O | | 9.2.3 | | — | — |
| >Location Reporting Information | O | | 9.2.21 | Includes the necessary parameters for location reporting | — | — |
| UE History Information | M | | 9.2.38 | Same definition as in [4]. | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |

Step 34: after receiving the HO Request, the target eNB knows that the UE which is about to handover access needs the E-CID positioning according to the E-CID positioning measurement related information, and feeds back the HO Request ACK (response) signaling to the source eNB.

Step 35: after receiving the HO Request ACK signaling, the source eNB transmits a handover command to the UE.

Step 36: after receiving the handover command, the UE transmits a Random Access Request (random access request) carrying the preamble(preamble) of the UE to the target eNB.

Step 37: after receiving the Random Access Request, the target eNB replies a Random access response (random access response) to the UE, and prepares to measure the UE AOA and a Rx-Tx measurement value at the target eNB side.

Step 38: after receiving the Random access response from the target eNB and randomly accessing the target eNB successfully, the UE performs the E-CID positioning measurement between the UE and the target eNB, and transmits the measurement report carrying the measurement result to the target eNB after completing the measurement. When adopting the Rx-Tx measurement method, the measurement result mainly includes: Rx-Tx time difference at the UE side.

Step 39: the target eNB transmits the measurement result reported by the UE, the UE AOA and Rx-Tx at the target eNB side measured by the target eNB itself, the position information of the target eNB itself and the E-CID positioning measurement related information of the UE to a MME together.

Step 310: the MME forwards the information transmitted from the target eNB to an E-SMLC.

Step 311: after receiving the information transmitted from the MME, the E-SMLC knows to initiate the positioning service for which UE according to the E-CID positioning measurement related information of the UE. Then, the E-SMLC calculates the precise position of the UE according to the measurement result reported by the UE, the UE AOA and the Rx-Tx at the target eNB side measured by the target eNB itself, and the position information of the target eNB itself.

The process of calculating the precise position of the UE by the E-SMLC mainly includes:

1. The E-SMLC may calculate a circle on which the UE locates according to the Rx-Tx at the UE side and the Rx-Tx at the target side, where the target eNB is the center of the circle, and the radius of the circle is R, and R may be expressed as:

$$R = \frac{(UE\ Rx - Tx) + (eNB\ Rx - Tx)}{2} v$$

where V is speed of light in the expression above.

2. The E-SMLC may calculate the point of the circle on which the UE locates according to the AOA information.

3. The E-SMLC calculates the coordinate information of the UE according to the coordinate information of the target eNB.

According to the technical solutions provided by embodiments of the present invention, the source base station transmits the positioning measuring related information of the user equipment to the target base station, thereby enabling the target base station to perform positioning measurement for the user equipment immediately after the UE has successfully accesses the target base station, and eliminating the need for a positioning server to retrigger a user equipment positioning process, thus reducing the signaling cost caused by retriggering the user equipment positioning process, and shortening the positioning delay of the user equipment.

Embodiment 3

Figure 4:
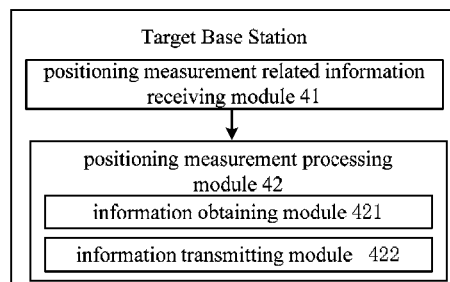
FIG. 4 is a specific structural diagram of a target base station according to a third embodiment of the present invention.

This embodiment provides a target base station, the specific structure of which is as shown in FIG. 4, including following modules:

a positioning measurement related information receiving module 41, configured to receive positioning measurement related information of a user equipment transmitted from a source base station of the user equipment in a handover process; and a positioning measurement processing module 42, configured to perform a positioning measurement for the user equipment according to the positioning measurement related information after the user equipment has accessed the target base station successfully.

In particular, the positioning measurement processing module 42 may include:

an information obtaining module 421, configured to measure a user equipment angle of arrival AOA, and receiving time and transmitting time at the target base station side according to the positioning measurement related information when performing an enhanced cell ID positioning method E-CID positioning for the user equipment after the user equipment has accessed the target base station successfully; and receive receiving time and transmitting time at the user equipment side transmitted by the user equipment, wherein the receiving time and the transmitting time at the user equipment side is obtained by the user equipment measuring according to the positioning measurement related information; and an information transmitting module 422, configured to transmit the user equipment angle of arrival, the receiving time and the transmitting time at the target base station side, the receiving time and the transmitting time at the user equipment side and position information of the target base station, and the positioning measurement related information to a mobility management entity, so that the mobility management entity then forwards the received information to the positioning server, and the positioning server calculates position information of the user equipment according to the received information.

Figure 5:
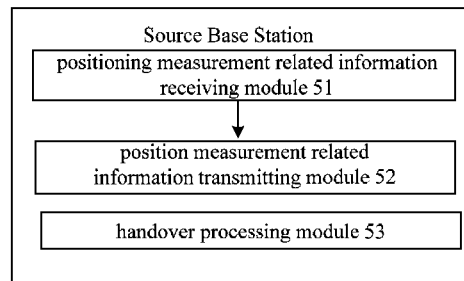
FIG. 5 is a specific structural diagram of a source base station according to a third embodiment of the present invention.

This embodiment also provides a source base station, the specific structure of which is as shown in FIG. 5, including following modules:

a positioning measurement related information receiving module 51, configured to receive positioning measurement related information of a user equipment in a handover process transmitted from the mobility management entity, where the positioning measurement related information is transmitted to the mobility management entity by a positioning server;

a positioning measurement related information sending module 52, configured to transmit the positioning measurement related information to the user equipment and a target base station of the user equipment.

Further, the source base station may also include:

a handover processing module 53, configured to trigger the handover process of the user equipment, receive signal intensity and identity information of each neighboring cell transmitted by the user equipment, and determine the target base station of the user equipment according to the signal intensity and the identification information of each neighboring cell.

Figure 6:
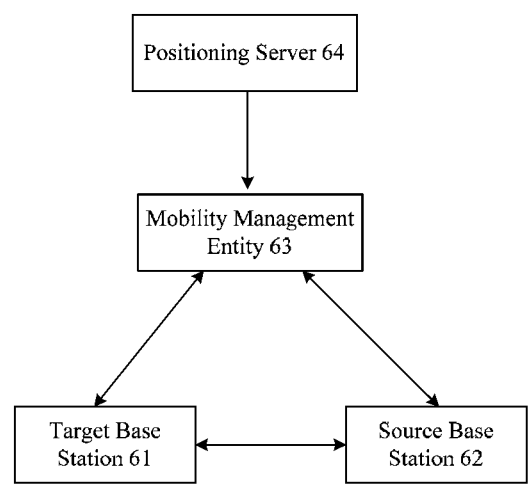
FIG. 6 is a specific structural diagram of a system for positioning a UE according to a third embodiment of the present invention.

This embodiment also provides a system for positioning a user equipment in a handover process, the specific structure of which is as shown in FIG. 6, including following modules:

a target base station 61, configured to receive positioning measurement related information of a user equipment transmitted from a source base station of a user equipment in a handover process, and perform a positioning measurement for the user equipment according to the positioning measurement related information after the user equipment has accessed the target base station successfully. The specific structure of the target base station 61 is as shown in FIG. 4.

A source base station 62, configured to receive the positioning measurement related information of the user equipment in the handover process transmitted from a mobility management entity, where the positioning measurement related information is transmitted to the mobility management entity by the positioning server; transmits the positioning measurement related information to the user equipment and the target base station of the user equipment. The specific structure of the source base station 62 is as shown in the FIG. 5.

Further, the system may also include:

a mobility management entity 63, configured to transmit positioning measurement related information transmitted from a positioning server to the source base station, and transmit a user equipment angle of arrival, receiving time and transmitting time at the target base station side, receiving time and transmitting time at the user equipment side and position information of the target base station, and the positioning measurement related information transmitted from the target base station to the positioning server;

a positioning server 64, configured to transmit the positioning measurement related information of the user equipment to the mobility management entity, and calculate position information of the user equipment according to the user equipment angle of arrival, the receiving time and the transmitting time at the target base station side, the receiving time and the transmitting time at the user equipment side and the position information of the target base station, and the position measurement related information transmitted from the mobility management entity.

The specific process of positioning the user equipment in the handover process by using the device and system in embodiments of present invention is similar to the foregoing method embodiments, and details are not repeatedly described here.

Persons of ordinary skill in the art should understand that all or part of the steps of the method according to the foregoing embodiments may be implemented by a program instructing relevant hardware. The program may be stored in a computer readable storage medium, when the program runs, the steps of the methods according to the foregoing embodiments are performed. Where, the storage medium may include a magnetic disk, an optical disk, a read only memory (Read-Only Memory, ROM) or a random access memory (Random Access Memory, RAM), and so on.

In conclusion, according to the technical solutions provided by embodiments of the present invention, the source base station transmits the positioning measuring related information of the user equipment to the target base station, thereby enabling the target base station to perform positioning measurement for the user equipment immediately after the UE has successfully accesses the target base station, and eliminating the need for a positioning server to retrigger a user equipment positioning process, thus reducing the signaling cost caused by retriggering the user equipment positioning process, and shortening the positioning delay of the user equipment.

Embodiments of the present invention may raise the E-CID positioning success rate of the user equipment in the handover process, and may avoid the handover failure rate caused by performing the positioning measurement.

The foregoing description is merely preferred specific implementation manners of the present invention, and should not be considered as a limitation of the protection scope of the present invention, any variation or replacement readily made by persons skilled in the art within the technical scope disclosed in the present invention shall fall within the protection scope of the present invention. Therefore, the protection scope of the present invention shall be subject to the protection scope of the claims.

What is claimed is:

1. A method for positioning a user equipment in a handover process, comprising:
   receiving, by a target base station of the user equipment in the handover process, positioning measurement related information of the user equipment transmitted from a source base station of the user equipment; and
   performing, by the target base station, a positioning measurement for the user equipment according to the positioning measurement related information after the user equipment has accessed the target base station successfully;

wherein the performing, by the target base station, the positioning measurement for the user equipment according to the positioning measurement related information after the user equipment has accessed the target base station successfully, comprises:

measuring, by the target base station, a user equipment angle of arrival and receiving time and transmitting time at a target base station side according to the positioning measurement related information when performing an enhanced cell ID positioning method E-CID positioning for the user equipment after the user equipment has accessed the target base station successfully;

receiving, by the target base station, receiving time and transmitting time at a user equipment side transmitted by the user equipment, wherein the receiving time and the transmitting time at the user equipment side is obtained by the user equipment measuring according to the positioning measurement related information; and transmitting, by the target base station, the user equipment angle of arrival, the receiving time and the transmitting time at the target base station side, the receiving time and the transmitting time at the user equipment side and position information of the target base station, and the positioning measurement related information to a mobility management entity, so that the mobility management entity then forwards the received information to a positioning server, and the positioning server calculates position information of the user equipment according to the received information.

2. The method for positioning the user equipment in the handover process according to claim 1, wherein, the receiving, by the target base station of the user equipment in the handover process, the positioning measurement related information of the user equipment transmitted from the source base station of the user equipment, comprises:

receiving, by the source base station, the positioning measurement related information of the user equipment transmitted from the mobility management entity, wherein the positioning measurement related information is transmitted to the mobility management entity from the positioning server, and transmitting, by the source base station, the positioning measurement related information to the user equipment;

triggering, by the source base station, the handover process of the user equipment, receiving signal intensity and identity information of each neighboring cell transmitted by the user equipment, and determining the target base station of the user equipment according to the signal intensity and the identification information of each neighboring cell;

transmitting, by the source base station, a handover request to the target base station, wherein the handover request comprises the positioning measurement related information of the user equipment.

3. The method for positioning the user equipment in the handover process according to claim 1, wherein the positioning measurement related information comprises: a Long Term Evolution Positioning Protocol Class A transaction identity, a user equipment measurement identity of a positioning sever, a user equipment measurement identity of a base station and information indicating the user equipment to perform the positioning measurement.

4. A target base station, comprising:
a positioning measurement related information receiving module, configured to receive positioning measurement related information of a user equipment transmitted from a source base station of the user equipment in a handover process; and
a positioning measurement processing module, configured to perform a positioning measurement for the user equipment according to the positioning measurement related information after the user equipment has accessed the target base station successfully;
wherein the positioning measurement processing module comprises:
an information obtaining module, configured to measure a user equipment angle of arrival, and receiving time and transmitting time at a target base station side according to the positioning measurement related information when performing an enhanced cell ID positioning method (E-CID) positioning for the user equipment after the user equipment has accessed the target base station successfully; and receive receiving time and transmitting time at a user equipment side transmitted by the user equipment, wherein the receiving time and the transmitting time at the user equipment side is obtained by the user equipment measuring according to the positioning measurement related information; and
an information transmitting module, configured to transmit the user equipment angle of arrival, the receiving time and the transmitting time at the target base station side, the receiving time and the transmitting time at the user equipment side and position information of the target base station, and the positioning measurement related information to a mobility management entity, so that the mobility management entity then forwards the received information to the positioning server, and the positioning server calculates position information of the user equipment according to the received information.

5. A method for positioning a user equipment in a handover process, comprising:
receiving, by a first base station, a handover request sent from a second base station, the handover request indicating a transfer of the user equipment from the second base station to the first base station; wherein the handover request further includes positioning measurement related information of the user equipment, the positioning measurement related information indicates that the first base station measure positioning of the user equipment;
receiving an access request from the user equipment and replying an access response to the user equipment; and
performing, by the first base station, a positioning measurement for the user equipment according to the positioning measurement related information;
wherein the performing, by the first base station, the positioning measurement for the user equipment according to the positioning measurement related information comprises:
measuring, by the first base station, a user equipment angle of arrival and receiving time and transmitting time at a first base station side according to the positioning measurement related information when performing an enhanced cell ID positioning method (E-CID) positioning for the user equipment after the user equipment has accessed the first base station successfully; and
receiving, by the first base station, receiving time and transmitting time at a user equipment side transmitted by the user equipment, wherein the receiving time and the transmitting time at the user equipment side is obtained by the user equipment measuring according to the positioning measurement related information;
further comprising:
transmitting, by the first base station, the user equipment angle of arrival, the receiving time and the transmitting time at the first base station side, the receiving time and the transmitting time at the user equipment side and position information of the first base station, and the positioning measurement related information to a mobility management entity, so that the mobility management entity then forwards the received information to the positioning server, and the positioning server calculates position information of the user equipment according to the received information.

6. The method according to claim 5, wherein the positioning measurement related information comprises: a Long Term Evolution Positioning Protocol Class A transaction identity, a user equipment measurement identity of a positioning sever, a user equipment measurement identity of a base station and information indicating the user equipment to perform the positioning measurement.

7. The method according to claim 5, wherein the handover request is received via an X2 interface.

8. A non-transitory computer readable storage medium, comprising computer program codes when executed by a computer processor causing the compute processor to execute steps of:
receiving, by a first base station, a handover request sent from a second base station, the handover request indicating a transfer of the user equipment from the second base station to the first base station; wherein the handover request further includes positioning measurement related information of the user equipment, the positioning measurement related information indicates that the first base station measure positioning of the user equipment;
receiving an access request from the user equipment and replying a access response to the user equipment; and
performing, by the first base station, a positioning measurement for the user equipment according to the positioning measurement related information;
wherein the performing, by the first base station, the positioning measurement for the user equipment according to the positioning measurement related information comprises:
measuring, by the target base station, a user equipment angle of arrival and receiving time and transmitting time at a target base station side according to the positioning measurement related information when performing an enhanced cell ID positioning method (E-CID) positioning for the user equipment after the user equipment has accessed the first base station successfully; and
receiving, by the first base station, receiving time and transmitting time at a user equipment side transmitted by the user equipment, wherein the receiving time and the transmitting time at the user equipment side is obtained by the user equipment measuring according to the positioning measurement related information;
further comprising:
transmitting, by the first base station, the user equipment angle of arrival, the receiving time and the transmitting time at the first base station side, the receiving time and the transmitting time at the user equipment side and position information of the first base station, and the positioning measurement related information to a mobility management entity, so that the mobility management entity then forwards the received information to the positioning server, and the positioning server calculates position information of the user equipment according to the received information.

\* \* \* \* \*